United States Patent [19]
Joh

[11] Patent Number: 5,870,566
[45] Date of Patent: Feb. 9, 1999

[54] PORT EXPANSION NETWORK AND METHOD FOR LAN HUBS

[75] Inventor: Clarence Chulljoon Joh, Allentown, Pa.

[73] Assignee: Lucent Technologies, Inc., Murray Hill, N.J.

[21] Appl. No.: 900,043

[22] Filed: Jul. 24, 1997

Related U.S. Application Data

[63] Continuation of Ser. No. 343,287, Nov. 22, 1994, abandoned.

[51] Int. Cl.$^6$ ................................................. G06F 13/36
[52] U.S. Cl. ..................... 395/200.81; 395/287; 395/728; 370/452
[58] Field of Search ..................... 395/800.01, 200.38, 395/200.43, 200.47, 200.81, 856, 857, 860, 281, 287, 309, 726–732, 200.83; 340/825, 825.06, 825.5; 370/254, 351, 406, 452, 455, 460, 461, 462

[56] References Cited

U.S. PATENT DOCUMENTS

| | | | |
|---|---|---|---|
| 3,633,169 | 1/1972 | Bickford | 364/200 |
| 4,513,373 | 4/1985 | Sheets | 364/200 |
| 4,536,877 | 8/1985 | Livingston et al. | 370/94 |
| 4,570,167 | 2/1986 | Sugitani et al. | 346/140 R |
| 4,608,685 | 8/1986 | Jain et al. | 370/85 |
| 4,637,015 | 1/1987 | Bobey | 370/94 |
| 4,674,085 | 6/1987 | Aranguren et al. | 370/60 |
| 4,787,082 | 11/1988 | Delaney et al. | 370/85 |
| 4,787,083 | 11/1988 | Tanaka | 370/85 |
| 4,805,169 | 2/1989 | Van Asselt | 370/85 |
| 4,825,435 | 4/1989 | Amundsen et al. | 370/97 |
| 4,866,702 | 9/1989 | Shimizu et al. | 370/60 |
| 4,866,704 | 9/1989 | Bergman | 370/85 |
| 4,872,158 | 10/1989 | Richards | 370/58.1 |
| 4,982,400 | 1/1991 | Ebersole | 370/85.15 |
| 4,998,247 | 3/1991 | Irvine-Halliday et al. | 370/94.1 |
| 5,014,269 | 5/1991 | Picandet | 370/85 |
| 5,018,139 | 5/1991 | Despres | 370/94.3 |
| 5,041,963 | 8/1991 | Ebersole et al. | 364/200 |
| 5,042,031 | 8/1991 | Yokoyama et al. | 370/85.5 |
| 5,043,938 | 8/1991 | Ebersole | 364/900 |
| 5,237,567 | 8/1993 | Nay et al. | 370/85 |
| 5,239,673 | 8/1993 | Natarajan | 455/33.1 |
| 5,319,644 | 6/1994 | Liang | 370/85.5 |
| 5,353,282 | 10/1994 | Dormer et al. | 370/58.1 |
| 5,390,173 | 2/1995 | Spinney et al. | 370/60 |
| 5,392,285 | 2/1995 | Kurts | 370/85.2 |
| 5,414,708 | 5/1995 | Webber et al. | 370/85.3 |
| 5,432,907 | 7/1995 | Picazo, Jr. et al. | 395/200.02 |
| 5,469,438 | 11/1995 | Baumert et al. | 370/85.11 |
| 5,485,455 | 1/1996 | Dobbins et al. | 370/60 |
| 5,509,123 | 4/1996 | Dobbins et al. | 395/200.15 |
| 5,515,510 | 5/1996 | Kikinis | 395/200.02 |

OTHER PUBLICATIONS

"Demand Priority Preliminary Draft", Submitted to IEEE 802.12, Jan. 1994.

"Draft Standard—Information Technology Local and Metropolitan Networks—Part 12: Demand Priority Access Method and Physical Layer Specifications", Sponsor: Lan Man Standards Committee of the IEEE Computer Society, P802.12, Mar. 1994.

*Primary Examiner*—Alpesh M. Shah

[57] ABSTRACT

An expandable local area hub network is provided by the present invention. The network comprises a plurality of hubs interconnected for direct communication. Each hub includes a plurality of ports for interfacing with remote stations, wherein the remote stations make requests that packets be transmitted on a memory coupled to the plurality of hubs. In use, one of the plurality of hubs is designated as a temporary controlling hub having controlling access to the memory bus to transmit packets on the memory bus. The temporary controlling hub relinquishing access to the memory bus when the temporary controlling hub has no requests to dispatch a packet on said memory bus.

17 Claims, 2 Drawing Sheets

PORT EXPANSION NETWORK AND METHOD FOR LAN HUBS

This is a continuation continuation-in-part of application Ser. No. 08/343,287, filed on Nov. 22, 1994, now abandoned.

FIELD OF THE INVENTION

The present invention relates to local area networks and, more particularly, to an extendable, round robin, local area hub network, such as may be employed in computer communications.

BACKGROUND OF THE INVENTION

With the recent expansion in the use of computers and computer terminals it is not unusual to have a large number of computers and terminals within a limited local area. It is very desirable to couple these units together to allow sharing of resources and permit a single terminal to access a plurality of other computers or terminals. One way of accomplishing this is the local area network (LAN). A local area network provides switching and data distribution for the transmission of information and allows computers to communicate with each other. LAN's further allow any single terminal to have access to a multiplicity of computers and peripheral equipment.

Local Area Networks, such as are used, for example, in computer communications, are well known and described in U.S. Pat. No. 5,041,963, entitled, "Local Area Network with an Active Star Topology Comprising Ring Controllers having Ring Monitor Logic Function", by Ebersole et al., issued Aug. 20, 1991; U.S. Pat. No. 4,998,247, entitled, "Active Star-Configured Local Area Network", by Irvine-Halliday et al., issued Mar. 5, 1991; U.S. Pat. No. 4,982,400 entitled, "Ring Bus Hub for a Star Local Area Network", by Ebersole, issued Jan. 1, 1991; U.S. Pat. No. 4,825,435, entitled "Multiport Repeater", by Amundsen et al., issued Apr. 25, 1989; U.S. Pat. No. 4,872,158, entitled, "Distributed Control Rapid Connection Circuit Switch", by Richards, issued Oct. 3, 1989; U.S. Pat. No. 4,787,082, entitled, "Dataflow Control Arrangement for Local Area Network", by Delaney et al., issued Nov. 22, 1988; U.S. Pat. No. 4,674,085, entitled, "Local Area Network", by Aranguren et al., issued Jun. 16, 1987; all of the foregoing being incorporated by reference.

The stations or nodes of a local area network may be configured in a variety of shapes, such as, for example, as a ring or a star. In a star-configured or local area hub network, multiple, discrete, remote stations are coupled through a central site or station, termed a hub station. The hub station follows a particular or predetermined signaling protocol to establish communications and to determine the order in which remote stations are permitted to transmit data over the network in the form of signals, such as electrical or optical signals. In one such signaling protocol, termed round robin, each of the remote stations is separately polled for transmissions. Likewise, in a round robin signaling protocol, only one station may transmit electrical signal data over the network at a time; that is, only one station may have controlling access to transmit a packet on a memory bus.

According to a ring network topology, transmission is from node to node around a closed loop and each node may alter the data passing therethrough. Each data processing device is connected to a separate node and intercepts only data messages specifically directed to a node. Since the data flows through each node and since the nodes are distributed, no central node may be separately secured and hence, the security and privacy of a ring network topology is somewhat less than that of the star network topology. Additionally, all nodes are in one closed loop and, failure of a single node may render the whole ring network inoperative. The closed loop topology also limits flexibility in some arrangements where adding new nodes or data processing stations results in the loss of data.

As with the star topology discussed above, hubs in a ring topology must follow a particular or predetermined signaling protocol to establish communications and to determine the order in which remote stations are permitted to transmit data over the network in the form of signals. The round robin signaling protocol discussed above is one such protocol and is applicable to a ring topology in the same manner it applies to a star topology.

Data transmission in a bus network topology is typically broadcast from one source to all other devices on the same bus, but is normally only accepted by the device to which it is specifically addressed. Individual data processing devices are programmed to recognize data messages addressed to or intended for them as they pass them by on the bus. The reliability of the bus network topology, in terms of network node failure, is greater than that of the ring network topology, although a break in the bus may be catastrophic. There is also greater flexibility in adding new data processing devices to the system than is normally possible with the star topology since no wiring reconfiguration is required. Although a round robin protocol is generally not applicable to a bus topology, it might be applicable if one hub is designated as the controlling hub. If this were the case, the controlling hub would be programmed with logic to govern the remaining hubs in accordance with the round robin protocol.

As disclosed and described in Draft for Standard Information Technology Local and Metropolitan Networks—Part 12—Demand Priority Access Method and Physical Layer Specification, P802.12, dated March 1994, herein incorporated by reference, a round robin protocol has been proposed to the IEEE to be employed in the local area networks transmitting data in the form of electrical signals 100 megabits per second, termed 100 Base VG. A round robin protocol provides advantages over other known network protocols, such as the protocol employed by the IEEE standard 802.3, also known as CSMA/CD (Carrier Sense Multiple Access with Collision Detection). The advantages associated with the round robin protocol are especially applicable for time sensitive multimedia communication tasks. Specifically, in multimedia applications it becomes desirable to prioritize or control access to the media or communication networks provided to different remote stations. The prioritized or controlled access permits more important communications tasks to obtain access to the network earlier than the less important tasks.

Several different media can be used to carry local area network communications. Considerations regarding network topology, maximum distance between nodes, volume of information to be transmitted, and speed of transmission are critical in a selecting particular communications medium. Physical limitations such as plenum, conduit sizes, and routing plans in the building also affect the choice of the medium. Finally, for some network topologies, user accessibility to the bus for passive tapping is also extremely important.

FIG. 1 is a schematic diagram of one embodiment of a conventional local area star-configured or hub shaped network. As previously suggested, in a local area hub network, the remote stations 10 may be arranged in a star-shaped network, or in a star configuration, in which a central station acts as a hub 12 for the remote stations 10. Thus, a hub or hub station may be used to transmit a signal packet, such as an electrical signal packet, from one remote station to another remote station, or multiple remote stations, since all of the remote stations are in direct communications with, or directly coupled to, the hub. Remote stations may comprise, for example, a data terminal or other computer-related equipment, as described in the aforementioned Demand Priority Access document.

In the context of the invention, the term "packet" refers to a complete and discrete grouping of data in the form of signals, typically digital signals, for transmission between stations. Thus, for example, a packet may comprise digital signals to be transmitted. Typically, packets include a start of frame delimiter (SFD), and an end of frame delimiter (EFD). Likewise, as described on page 4-3 of the aforesaid Demand Priority Access document, and as illustrated in FIG. 2, a packet may further include binary digital signals, or bits, representing, for example, a destination address (DA), a source address (SA), the length of the packet (L), the data to be transmitted (DATA), and a frame check sequence (FCS) for signal error checking.

In the network illustrated in FIG. 1, packets, such as electrical signal packets, transmitted between two remote stations must pass through the hub. Depending on the particular network, the hubs typically have the capability to perform and recognize a signaling protocol (often termed "handshaking"), the capability to identify and extract data from an electrical signal packet, the capability to store data in the form of electrical signals, the capability to perform signal error checking, and the capability to perform destination address matching, such as described in the aforementioned Demand Priority Access document.

For a local area hub network, it often becomes desirable to increase the size of the network without substantially degrading signal transmission performance; that is, it is desirable for the network to be extendible. However, as local area hub networks increase in size, the hardware for communications between remote stations of the network becomes increasingly complex. For example, technological limitations on the manufacture of integrated circuit chips typically restrict the number of ports that may be fabricated on one chip. Specifically, in any integrated chip implementation of a multiple-port LAN hub the number of user ports is usually limited to between six and twelve per single hub integrated chip due to physical limitation. Thus, for a large local area hub network having, for example, tens or hundreds of stations, communications between the remote stations directly linked or coupled to one hub station in the network may need to be shared among several, discrete devices or chips. Additionally, since all the network traffic must go through a specific hub, the bandwidth available to each port decreases as more ports are added to the hub. Further, the problem of performing or controlling round robin polling between these discrete devices also becomes more complex.

One way to overcome the limited number of ports available on a signal hub is the coupling of hubs to form a local area hub network consisting of multiple hubs. For such a local area hub network, the hubs should be coupled and signals must be communicated between the hubs so that the performance of the round robin signaling protocol is not substantially degraded. Furthermore, it is desirable not to increase the complexity of the hardware unduly and to exhibit low pin or port overhead by reducing the number or maintaining a relatively low number of ports needed to accomplish satisfactory operation.

In view of the foregoing discussion a need exists for an extendable local area hub network which efficiently, reliably and functionally increases the number of ports available on a local area hub network. The present invention provides such a network.

SUMMARY OF THE INVENTION

An expandable local area hub network is provided by the present invention. The network comprises a plurality of hubs interconnected for direct communication. Each hub includes a plurality of ports for interfacing with remote stations, wherein the remote stations make requests that packets be transmitted on a memory bus coupled to the plurality of hubs. In use, one of the plurality of hubs is designated as a temporary controlling hub having controlling access to the memory bus to transmit packets on the memory bus. The temporary controlling hub relinquishes access to the memory bus when the temporary controlling hub has no requests to dispatch a packet on said memory bus.

Other objects, advantages and salient features of the invention will become apparent from the following detailed description, which taken in conjunction with the annexed drawings, discloses the preferred embodiment of the present invention.

DETAILED DESCRIPTION OF THE PREFERRED EMBODIMENT

The present invention provides an efficient and elegant method for expanding the number of available ports in a local area hub network operating under the 100Base VG round robin protocol disclosed in the aforementioned Demand Priority Access document.

Figure 1:
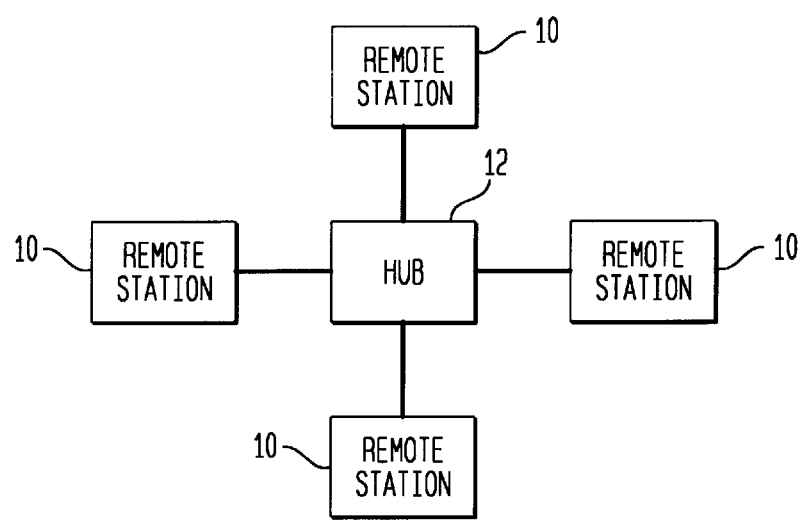
FIG. 1 is a schematic representation of the a central hub connected to a series of remote stations.
Figure 2:
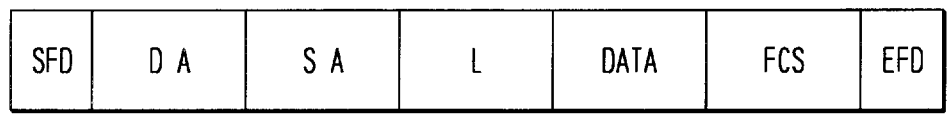
FIG. 2 is a schematic representation of a packet.
Figure 3:
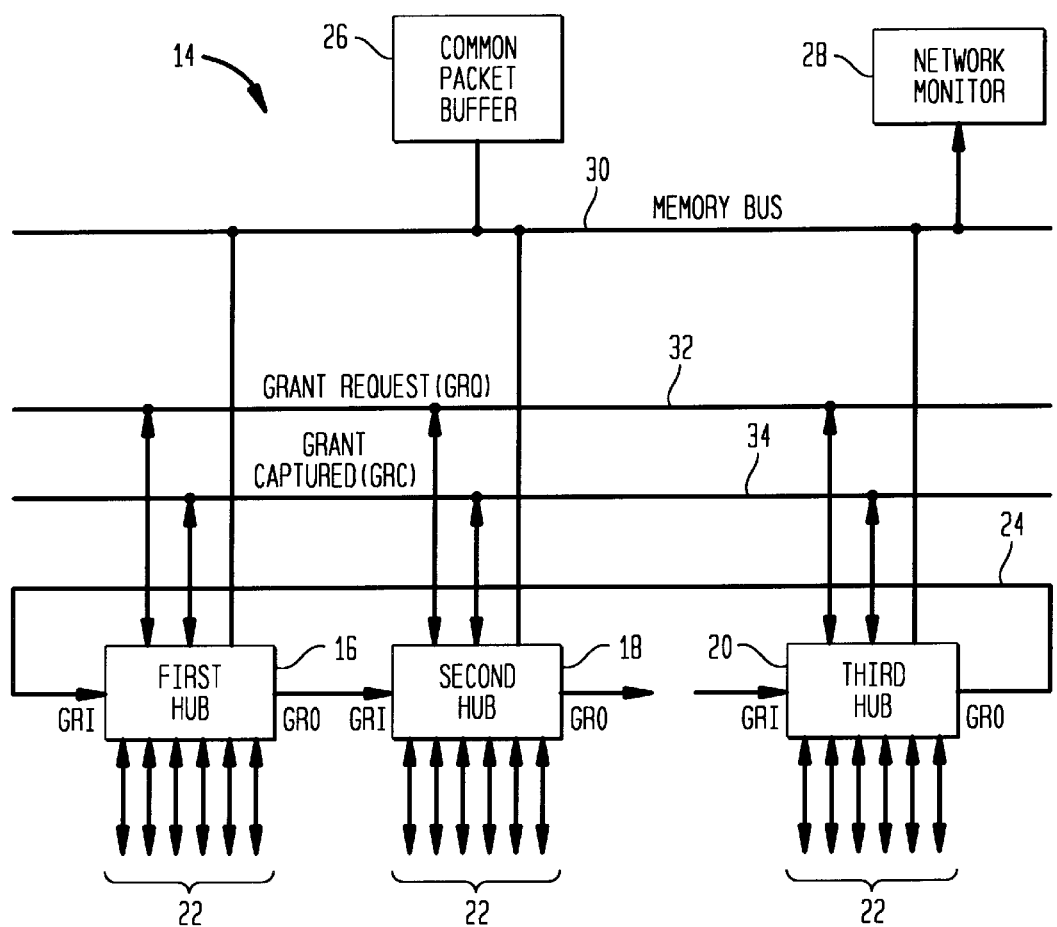
FIG. 3 is a schematic representation of the present network.

With reference to FIG. 3, the local area hub network 14 includes three hubs, first hub 16, second hub 18, and third hub 20. Nonetheless, the local area hub network 14 may include fewer hubs or more hubs depending upon the particular application or embodiment. The hubs are preferably, 100Base VG-protocol LAN hubs, and more particularly, 100Base VG Hub chip. As shown in FIG. 3, each hub includes 6 ports 22, although additional ports are possible without departing from the spirit of the invention, if the hub is physically able to accommodate the additional ports. Further, each hub contains all the internal logic necessary to function within the present network.

First hub 16, second hub 18 and third hub 20 are coupled to form a ring-shaped hub signal path, illustrated by signal path 24. That is, the hubs are connected in a daisy chain arrangement for reasons that will be discussed in more detail subsequently. In the context of the present invention, the terms "ring-shaped hub signal path" and "daisy chain arrangement" refer to any closed loop signal path regardless of the physical layout or topology, such as might arise, for example, from a signal path between different floors in a building.

The three hubs are coupled to a common packet buffer 26 and a network monitor 28 through a memory bus 30. The packet buffer 26 is capable of storing packet information transmitted on the memory bus 30, while the network monitor 28 enables a network administrator, or other interested individual, to monitor activity on the network 14. Each hub is also linked to a Grant Request (GRQ) line 32 and a Grant Captured (GRC) line 34. Each hub has continuous access to the GRQ line 32 to make requests for controlling access to the memory bus 30 to transmit packets and to the GRC line 34 to signal other hubs that a specific hub has been granted controlling access to the memory bus 30. Since all the hubs have continuous access to the GRQ and GRC lines, they are able to monitor whether other hubs have made requests to transmit a packet on the memory bus 30, via the GRQ line 32, or have been granted controlling access (that is, the hub has the Grant In (GRI) signal captured) to the memory bus for the purpose of transmitting a packet, via the GRC line 34.

According to the present invention, an arbitrary hub is initially selected as the controlling hub, for example, first hub 16. The controlling hub captures the GRI signal and controls access to the memory bus 30 and the writing capability onto the common packet buffer 26. When a hub is granted controlling access to the memory bus 30 by capturing the GRI signal, the controlling hub issues a GRC signal on the GRC line 34. Specifically, a hub is granted controlling access to the memory bus 30 when it captures the GRI signal. Only when a hub has controlling access to the memory bus 30 is the hub permitted to transmit a packet on the memory bus 30.

When the controlling hub has a pending request(s) at one of its ports 22 from a remote station (not shown), the controlling hub selects one port amongst its plurality of ports (that is, if more than one remote station makes a request), decodes the packet transmitted by the remote station, and descrambles the packet. If the controlling hub has more than one pending request, the hub relies upon its internal round robin protocol to determine the order in which the requests should be accommodated.

The hub then simultaneously dispatches the packet to its address matching unit and the common packet buffer 26 in bytes. The controlling hub's address matching unit reviews the designation address of the hub to determined whether the packet is directed to a remote station connected to the controlling hub. With regard to the transmission of the packet to the common packet buffer 26, each of the hubs connected to the common memory bus will decode the destination address of the packet, determine whether the packet is intended for one of the remote stations coupled to their ports, and capture the packet if the packet is intended for one of their remote stations.

If the packet is unicast and destined for another port of the controlling hub, the broadcast of the packet to the memory bus 30 is a wasted motion, although no harm is done. Specifically, the controlling hub, after realizing that the packet is destined for one of its own ports 22, retrieves the packet from the memory bus 30 and transmits it to the intended port and remote station.

If the packet is unicast and destined to one of the other hubs connected to the memory bus 30, the destination hub will identify the destination address through its address matching unit and capture the packet (even though it is not the controlling hub). In contrast to the previous situation where the packet was destined for another port of the controlling hub, the controlling (and originating) hub does not transmit the packet to one of its own output ports.

If, on the other hand, the packet is multicast, or broadcast, the controlling hub immediately transmits the packet to the common packet buffer 26 via the memory bus 30. While the dispatched packet is on the memory bus 30, each of the hubs decodes the destination address of the packet, and determines whether the packet is intended for one of the remote stations coupled to their ports based upon each hub's address matching units. All interested hubs, including the controlling hub, will then capture the dispatched packet and transmit the packet to the appropriate ports and remote stations.

If the controlling hub has no requests pending from its own ports 22 and identifies a Grant Request(s) (GRQ) on the GRQ line 32 from another hub(s), the controlling hub relinquishes its GRI signal, that is, controlling access to the memory bus, by issuing the GRO (Grant Out) and passing the GRI signal through the signal path 24 to its immediate neighboring hub. At the same time, the controlling hub turns off the GRC (Grant Captured) signal which had previously been sent on the GRC line 34.

If the neighboring hub is one of the hubs requesting the memory bus 30, that is, it has received requests from its own ports 22 and transmitted them to the GRQ line 32, it will capture the GRI (Grant In) signal, turn off its own GRQ signal on the GRQ line 32, and transmit a Grant Capture signal on the GRC line 34. If on the other hand, the hub has not requested controlling access to the memory bus 30, the hub will pass the Grant Out and the hub's downstream neighbor will receive the GRI signal through the signal path 24. Passage of the GRI signal around the signal path 24 continues as the network functions.

In this way, the present method provides a fair and dynamic priority, corresponding to the philosophy of the round robin nature of the demand priority protocol as disclosed in the aforementioned Demand Priority Access document.

With reference to the embodiment shown in FIG. 3, the present invention functions in the following manner. First hub 16 is arbitrarily chosen to begin as the controlling hub. If remote stations of the first hub 16 have placed a request(s) with the first hub 16, the requested packet(s) will be transmitted in the manner discussed above. The controlling first hub 16 will continue to accommodate requests and transmit packets until all requests have been accommodated. Once all requests have been accommodated and all packets have been transmitted, the first hub 16 looks to the GRQ line 32 to determine whether other hubs have transmitted Grant Requests. If the controlling first hub 16 identifies Grant Requests made by other hubs, the controlling first hub 16 will relinquish its GRI signal, that is, memory bus control, by issuing the GRO (Grant Out), forwarding the GRI signal on the signal path 24 to its immediate neighboring second hub 18 and turning off its GRC (Grant Captured) signal.

If second hub 18, now the controlling hub, has any outstanding requests from its remote stations, the requests will once again be accommodated in the manner discussed above. As with the previous controlling first hub 16, once all requests have been accommodated or if the second hub 18 has no outstanding requests, the second hub 18 will look to the GRQ line 32 to determine whether other hubs have transmitted Grant Requests. If the current controlling second hub 18 identifies any Grant Requests made by other hubs, the controlling second hub 18 will relinquish its GRI signal, that is, memory bus 30 control, by issuing the GRO, forwarding the GRI signal on the signal path 24 to its immediate neighboring third hub 20 and turning off its GRC signal. The controlling third hub 20 then follows the same procedure as the previous controlling hubs, and the system continues rotating through the three-hub ring shaped hub signal path.

As stated previously, the hubs may be implemented by integrated circuit chips, although the invention is not restricted in scope in this particular manner. Integrated circuit chips offer the convenience of a relatively small size device at a relatively moderate cost. As previously suggested, more than one hub is employed in those situations that require communication among a relatively large number of remote stations for a single hub station due to limitations on the number of ports for a single integrated circuit chip. Nonetheless, alternatively, these local area hub network components may be implemented with alternative technologies other than integrated circuitry, such as, for example, discrete electrical circuit components or logic gates. Furthermore, hubs need not be restricted to implementation on a single integrated circuit chip. The invention is also not restricted in terms of the type of couplings employed to manually connect or couple the hubs and other components; however, typical interconnection such as, for example, electrical conductive wires, optical fibers, or coaxial cable connections are employed.

Further, it may be possible to incorporate a hierarchy of Grant Requests. For example, each hub could either send a normal priority Grant Request or a high priority Grant Request. In the case of a normal Grant Request, the system would function as discussed above. However, transmission of a high priority Grant Request would cause the controlling hub to immediately relinquish control of the memory bus and pass the Grant In down the daisy chain.

While the preferred embodiment of the present invention has been shown and described, it will be understood that it is intended to cover all modifications and alternate methods falling within the spirit and scope of the invention as defined in the appended claims or their equivalents.

What is claimed is:

1. A method for expanding the number of ports available to a local area hub network including a plurality of hubs connected along a common memory bus, comprising the steps of:
    providing a plurality of hubs coupled through said memory bus in a ring-shaped network for direct communication, each of said hubs including a plurality of ports connected to remote stations, wherein said remote stations make requests that packets be transmitted on a memory bus;
    coupling said hubs to said memory bus; and
    designating a temporary controlling hub using said ring-shaped network and a grant-in signal, said temporary controlling hub having controlling access to said memory bus for dispatching a packet on said memory bus;
    wherein said temporary controlling hub relinquishes control of said memory bus to a predetermined hub using said ring-shaped network and a grant-out signal when said temporary controlling hub has no requests on a grant request line to dispatch a packet on said memory bus.

2. The method according to claim 1, further including the step of providing a grant capture line permitting said controlling hub to send a grant captured signal to other hubs indicating that said controlling hub has controlling access to said memory bus for the purpose of transmitting a packet.

3. The method according to claim 2, wherein said temporary controlling hub relinquishes controlling access to said memory bus by removing said grant captured signal from said grant captured line when said temporary controlling hub has no requests to dispatch a packet on said memory bus and said temporary controlling hub identifies a request for controlling access to said memory bus to transmit a packet.

4. The method according to claim 1, further including the step of providing a grant request line permitting hubs to make requests for controlling access to said memory bus to transmit a packet.

5. The method according to claim 3, wherein said temporary controlling hub relinquishes controlling access to said memory bus to a predetermined hub when said temporary controlling hub has no requests to dispatch a packet on said memory bus and said temporary controlling hub identifies a request for controlling access on said grant request line.

6. The method according to claim 1, further including the step of providing a network monitor permitting a network administrator to monitor said network.

7. A local area hub network having an expandable number of ports, comprising:
    a plurality of hubs interconnected through a memory bus in a ring-shaped network for direct communication, each hub including a plurality of ports for interfacing with remote stations wherein said remote stations make requests that packets be transmitted on a memory coupled to said plurality of hubs;
    wherein one of said plurality of hubs is designated as a temporary controlling hub using said ring-shaped network and a grant-in signal having controlling access to said memory bus to transmit packets on said memory bus, said temporary controlling hub relinquishing access to said memory bus using said ring-shaped network and a grant-out signal when said temporary controlling hub has no requests to dispatch a packet and said temporary controlling hub identifies a request on a grant request line on said memory bus.

8. The network according to claim 7, wherein said temporary controlling hub relinquishes controlling access to said memory bus to a neighboring hub.

9. The network according to claim 7, further including a grant capture line permitting said controlling hub to send a grant captured signal to other hubs indicating that said controlling hub has controlling access to said memory bus for the purpose of transmitting a packet.

10. The network according to claim 9, wherein said temporary controlling hub relinquishes controlling access to said memory bus by removing said grant captured signal from said grant captured line when said temporary controlling hub has no requests to dispatch a packet on said memory bus and said temporary controlling hub identifies a request for controlling access to said memory bus to transmit a packet.

11. The network according to claim 10, wherein said temporary controlling hub relinquishes controlling access to said memory bus to a neighboring hub.

12. The network according to claim 7, further including a grant request line permitting hubs to make requests for controlling access to said memory bus to transmit a packet.

13. The network according to claim 12, wherein said temporary controlling hub relinquishes controlling access to said memory bus to a predetermined hub when said temporary controlling hub has no requests to dispatch a packet on said memory bus and said temporary controlling hub identifies a request for controlling access on said grant request line.

14. The network according to claim 13, wherein said temporary controlling hub relinquishes controlling access to said memory bus to a neighboring hub.

15. The network according to claim 7, further including a network monitor permitting a network administrator to monitor said network.

16. The network according to claim 7, further including a common packet buffer coupled to said memory bus.

17. The network according to claim 7, wherein said temporary controlling hub relinquishes control of said memory bus to a neighboring hub.

* * * * *